United States Patent
Pathan

(10) Patent No.: US 7,529,256 B2
(45) Date of Patent: May 5, 2009

(54) COMMUNICATION DEVICE CLIENT UPDATE SYSTEM AND METHOD

(75) Inventor: Arnavkumar M. Pathan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 610 days.

(21) Appl. No.: 11/178,141

(22) Filed: Jul. 8, 2005

(65) Prior Publication Data

US 2007/0008981 A1      Jan. 11, 2007

(51) Int. Cl.
*H04L 12/28* (2006.01)

(52) U.S. Cl. .................... 370/401; 370/338; 370/475

(58) Field of Classification Search .............. None
See application file for complete search history.

(56) References Cited

U.S. PATENT DOCUMENTS

| | | | |
|---|---|---|---|
| 6,336,147 B1 | 1/2002 | Brownell et al. | 719/310 |
| 6,535,493 B1* | 3/2003 | Lee et al. | 370/329 |
| 6,556,574 B1* | 4/2003 | Pearce et al. | 370/401 |
| 6,975,864 B2 | 12/2005 | Singhal et al. | 455/438 |
| 6,977,939 B2* | 12/2005 | Joy et al. | 370/401 |
| 7,050,416 B2 | 5/2006 | Bichot et al. | 370/338 |
| 2004/0177276 A1* | 9/2004 | MacKinnon et al. | 713/201 |
| 2005/0114507 A1* | 5/2005 | Tarui et al. | 709/224 |
| 2005/0122921 A1* | 6/2005 | Seo | 370/310 |
| 2006/0031488 A1* | 2/2006 | Swales | 709/224 |
| 2006/0215623 A1* | 9/2006 | Lin et al. | 370/338 |
| 2006/0268794 A1* | 11/2006 | Sekhar | 370/338 |

OTHER PUBLICATIONS

Mirrors.isc.org, "Lightweight Directory Access Protocol: Extensions for Dynamic Directory Services," 8 pages total, Sep. 10, 1996, mirrors.isc.org/pub/www.watersprings.org/pub/id/draft-ietf/asid-idapv3ext-01.txt.

* cited by examiner

*Primary Examiner*—Duc C Ho
(74) *Attorney, Agent, or Firm*—Stolowitz Ford Cowger LLP

(57) ABSTRACT

A system and method that facilitates client address updating in a communication network is presented. Client address lists are maintained and updated with a single mechanism deployed flexibly across different communication environment boundaries. Network devices update address lists for clients deployed across boundaries of wireless communication environments (e.g., an IEEE 802.11 compliant environment) and wired communication environments (e.g., an IEEE 802.3 compliant environment). Interruptions and delays in information communication due to stale client registration and tracking activities are minimized.

19 Claims, 3 Drawing Sheets

COMMUNICATION DEVICE CLIENT UPDATE SYSTEM AND METHOD

FIELD OF THE INVENTION

This invention relates to the field of network communications. In particular, the present invention relates to a communication device client update system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reductions in analyzing and communicating data, ideas and trends in most areas of business, science, education and entertainment. Wireless networks are often utilized to realize many of these advantageous results. Wireless networks typically facilitate distributed processing and communication of information over large geographic areas to numerous devices. Managing communication activities and maintaining client address information can be difficult and problematic.

Wireless networks offer a number of potential advantages including permitting a user to be relatively mobile within coverage areas when engaging in communication activities. Wireless networks usually have a stationary basic infrastructure which communicates information to and from wireless mobile nodes or end user devices such as cell phones, laptops, personal digital assistants (PDAs) and a variety of other devices. A client (e.g., end user) normally accesses a wireless network via a mobile node (MN) by initiating a communication session with an access point (AP)/root device, such as a wireless router, switch, etc. The client typically initiates access by engaging in an authentication and registration process with centralized network resources via the access point. Traditionally the registration process is performed each time a mobile node enters within range or a geographical area associated with an access point.

The diversity and mobility of numerous potential clients makes it important in a wireless network to maintain accurate and updated information associated with clients logged onto a network. For example, root devices usually rely on a table or list of client media access control (MAC) addresses for forwarding traffic to appropriate clients. If a client suddenly roams away or otherwise "disconnects" from a root device without notifying the root device of the "disconnect" the root device does not update the table or list of client addresses leaving stale entries in the table or list of the root device which can cause significant interference with communication traffic.

Traditional communication devices usually continue to forward information to clients on an address list, even if the client has "left" or disconnected from the root device. For example, if an upstream device has information for delivery to a client address, the downstream or root device usually tries to forward the information to the "stale" client address if the address is still in the list of client addresses. Conventional communication devices will also usually attempt to forward broadcast information to stale client addresses. Attempts to forward information to stale clients can tie up bandwidth for useless communication of information to clients that are no longer registered or coupled with a device resulting in traffic problems and delays to other "useful" information being forwarded to active clients.

Conventional communication network limitations (e.g., bandwidth, etc.) often compound problems associated with traditional registration and tracking activities. For example, some traditional attempts try to use timer based flushing of the MAC address tables such that if a client does not generate traffic within a predetermined amount of time the client address is removed from the list. In these attempts to update an address list, a root device assumes that a client has roamed away or otherwise become disconnected since there is no traffic for the predetermined amount of time. However, this approach tends to erroneously remove clients from an address list and the clients do not receive communication information. Clients can still be associated with a root device but the client just happens not to produce any traffic.

DETAILED DESCRIPTION

Figure 1:
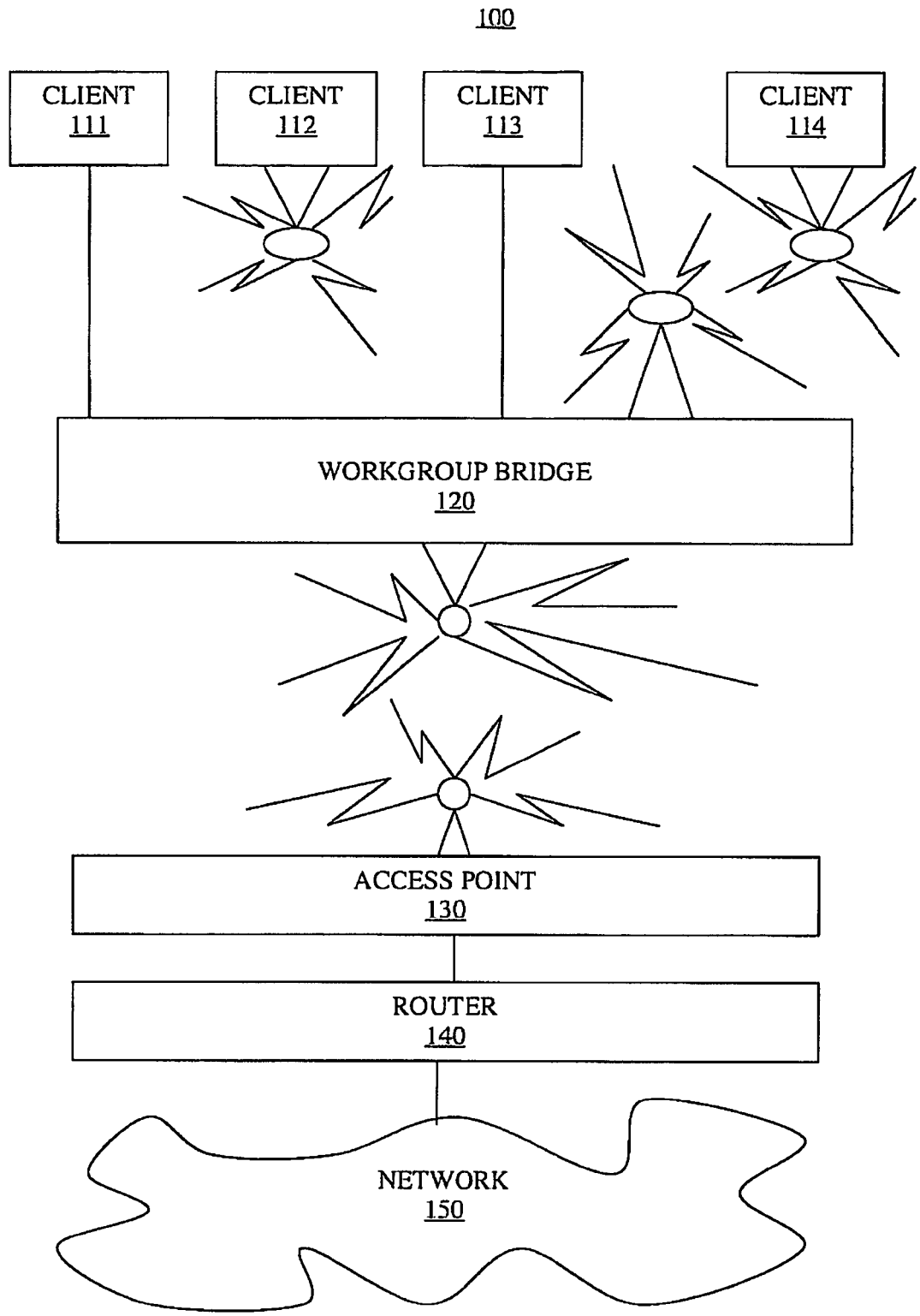
FIG. 1 is a block diagram of an exemplary communication system, in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is a system and method that facilitates client address updating in a communication network. The present invention enables network devices to update address lists for clients deployed across boundaries of wireless communication environments (e.g., an IEEE 802.11 compliant environment) and wired communication environments. Interruptions and delays in information communication due to stale client registration and tracking activities are minimized.

FIG. 1 is a block diagram of exemplary communication system 100 in accordance with one embodiment of the present invention. Communication system 100 enables update of client address lists across wireless and wired environment boundaries. Communication system 100 includes clients 111, 112, 113 and 114, workgroup bridge 120, access point 130, router 140 and network 150. Clients 111, 112, 113 and 114 are communicatively coupled to workgroup bridge 120 which in turn is communicatively coupled to access point 130. Access point 130 is communicatively coupled to router 140 which in turn is communicatively coupled to network 150. In one embodiment, client 114 is wirelessly communicatively coupled to workgroup bridge 120 and workgroup bridge 120 is wirelessly communicatively coupled to access point 130.

The components of communication system 100 cooperatively operate to communicate information and efficiently maintain an updated status of components communicatively coupled to communication system 100. Network 150 provides an infrastructure to communicate information to and from distributed resources. Router 140 routes information between access point 130 and network 150. In one exemplary implementation, router 140 performs level 3 communication routing. It is appreciated that access point 130 can be implemented as part of router 140 or separate from router 140. Access point 130 provides access to network 150 via router 140. In one embodiment of the present invention access point 130 is a wireless access point. Workgroup bridge 120 provides both wired and wireless communications bridges for clients (e.g., clients 111 through 114). Clients 111 and 113 utilize wired nodes to access workgroup bridge 120 and clients 112 and 114 utilize wireless nodes to access workgroup bridge 120.

The upstream components of communication system 100 track addresses of clients communicatively coupled to communication system 100. In one exemplary implementation, workgroup bridge 120, access point 130 and router 140 utilize address lists to track media access control (MAC) addresses of clients communicatively coupled to workgroup bridge 120. In one embodiment, address resolution protocol (ARP) requests are communicated across wireless and wired environment boundaries to maintain address list entries. For example, router 140 and/or access point 130 can forward address resolution requests to clients 111 through 114 via workgroup bridge 120 periodically (e.g., at predetermined time intervals). If a client responds to the ARP request the client is left on the client tracking list but if there is no client response to the ARP request the client is removed from the client tracking list.

Figure 2:
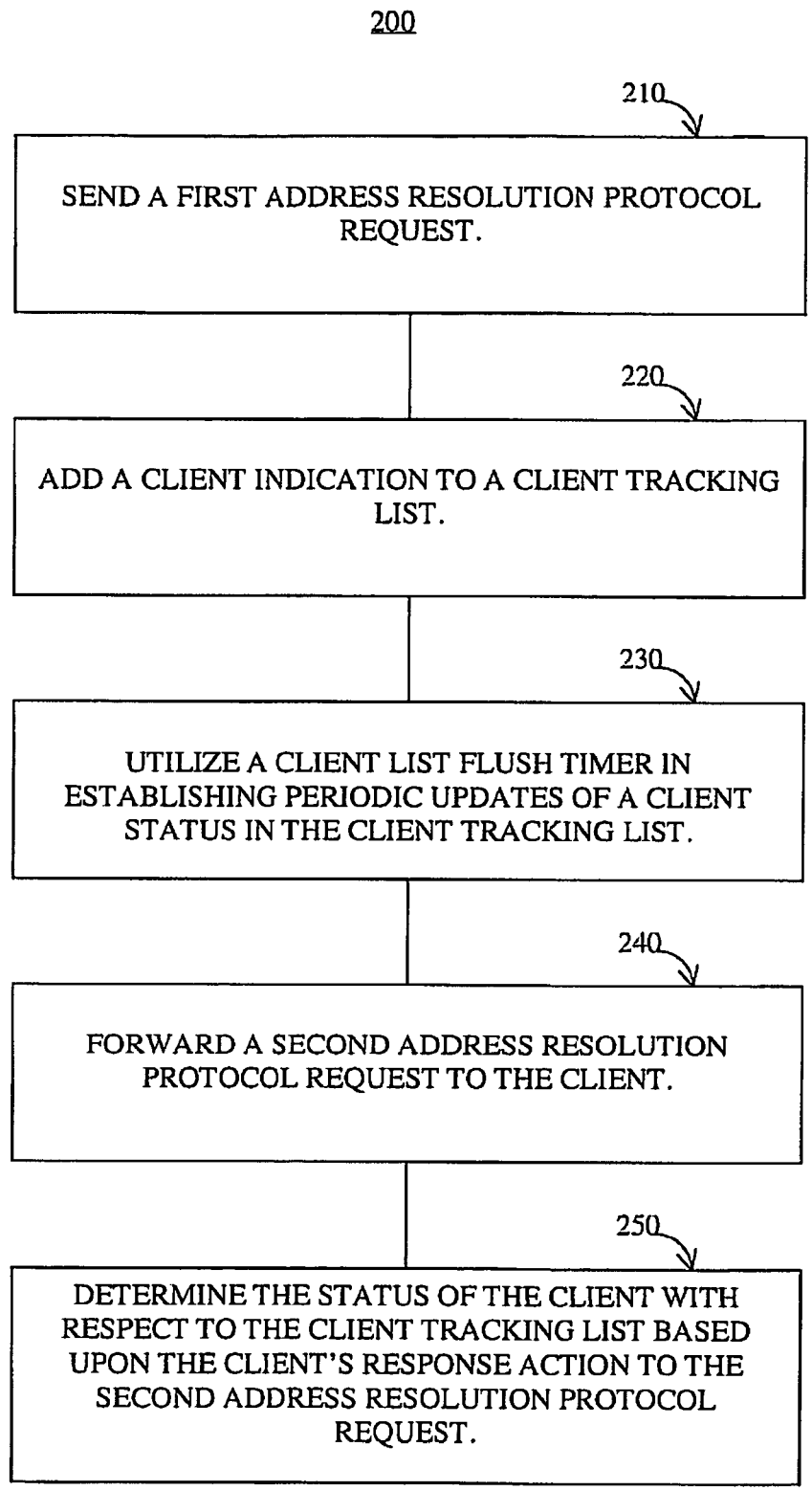
FIG. 2 is an exemplary flow chart of a communication network update method, in accordance with one embodiment of the present invention.

FIG. 2 is an exemplary flow chart of communication network update method 200 in accordance with one embodiment of the present invention. Communication network update method 200 facilitates accurate and efficient maintenance of client addresses in a communication network. Communication network update method 200 can update address lists with a single mechanism deployed flexibly across different communication environment boundaries (e.g., across wired environment and wireless environment boundaries).

In step 210, a first address resolution protocol request (ARP) is sent. In one embodiment of the present invention, the first address resolution protocol request is forwarded in accordance with standard address resolution protocol requests activities.

A client indication is added to a client tracking list in step 220. In one embodiment, the client indication corresponds to a client responding to the first address resolution protocol request. In one embodiment, the client indication is a media access control (MAC) address and the client tracking list is a media access control address list. In one exemplary implementation, the client tracking list is a list for tracking clients communicatively coupled to a workgroup bridge device which includes clients that are wired to the workgroup bridge device and clients that are wirelessly communicatively coupled to the workgroup bridge device. The workgroup bridge device can be wirelessly communicatively coupled to upstream components.

In step 230, a client list flush timer is utilized for establishing periodic updates of the status of a client indication in a client list. In one embodiment, the client list flush timer is run in cycles of predetermined length.

In step 240, a second address resolution protocol request is forwarded to the client. In one embodiment of the present invention, the second address resolution protocol request is forwarded after each time period or cycle of the client tracking list flush timer has expired and before taking an action with regard to the status of the client with respect to the client tracking list.

In step 250, a status of the client with respect to the client tracking list is determined based upon the client's response action with regard to the second address resolution protocol request. In one embodiment of the preset invention, determining the status of the client with respect to the client tracking list includes leaving the client on the client tracking list if the client responds to the second address resolution protocol request; and removing the client indication from the client tracking list if the client does not respond to the second address resolution protocol request. In one exemplary implementation, the status of the client with respect to an access point connectivity list is based upon the client's action with regard to the second address resolution protocol request.

In one embodiment of communication network update method 200, the address resolution protocol request is forwarded across a wireless to wired protocol boundary. For example, the address resolution protocol request can be forwarded across a boundary spanning an environment compliant with an IEEE 802.11 standard protocol and an environment compliant with an IEEE 802.3 standard protocol.

In one exemplary implementation, the status of the client is forwarded to upstream devices and the upstream devices incorporate the status in a connectivity list. For example, a workgroup bridge can initiate an ARP update request and forward the results (e.g., a client did or did not respond) to an upstream access point and/or router.

Figure 3:
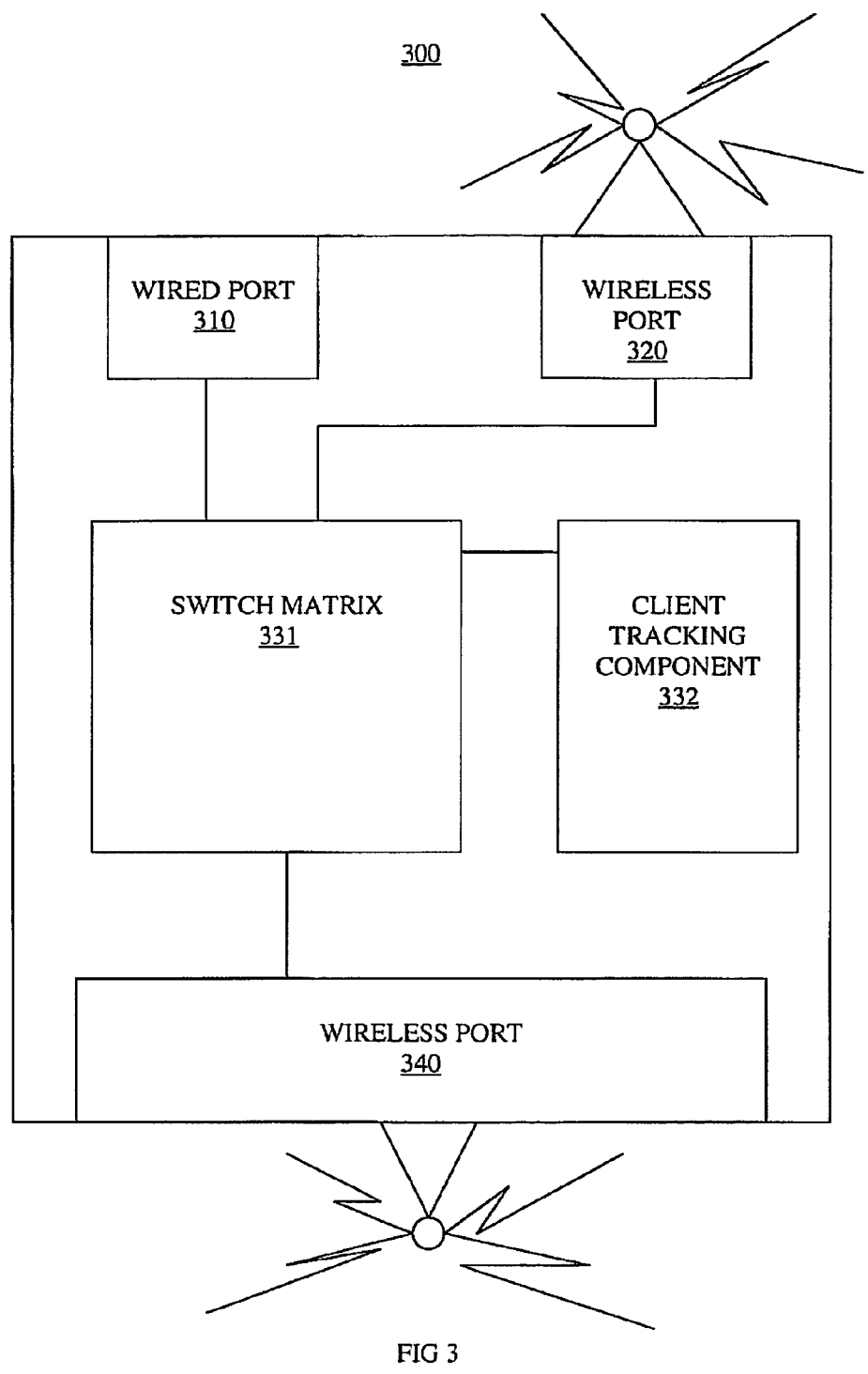
FIG. 3 is a block diagram of an exemplary root device, in accordance with one embodiment of the present invention.

FIG. 3 is a block diagram of exemplary root device 300, in accordance with one embodiment of the present invention. Root device 300 tracks client addresses in accordance with the present invention. For example, root device 300 can utilize ARP requests to update and maintain client addresses for clients deployed across both wired and wireless boundaries. Root device 300 comprises of wired port 310, wireless port 320, switch matrix 331, client tracking component 332 and wireless port 340. Wired port 310 and wireless port 320 are communicatively coupled to switch matrix 331 which is communicatively coupled to client tracking component 332 and wireless port 340.

The components of root device 300 cooperatively operate to communicate information and efficiently maintain an updated status of components communicatively coupled to root device 300. Wireless communication port 320 communicates an address resolution protocol request wirelessly to clients communicatively coupled to the root device 300. The wired communication port 310 communicates the address resolution protocol request via a wire. Switch matrix 331 directs information to wired port 310 and wireless port 320. Client tracking component 332 tracks clients communicatively coupled to the wireless communication port 320 and the wired communication port 310. In one exemplary implementation client tracking component 332 utilizes an address resolution protocol request to track the clients communicatively coupled to the wireless communication port 320 and the wired communication port 310. The client tracking component 332 forwards the address resolution protocol request before altering a client tracking list. For example, the client tracking component 332 alters the client tracking list by removing clients that do not respond to the address resolution protocol request.

In one embodiment, client tracking component 332 tracks media access control addresses of the clients communicatively coupled to the root device. The client tracking component 332 analyzes if a predetermined amount of time has expired since receiving a communication from each of the clients respectively and if the predetermined amount of time has expired the rood device forwards the address resolution protocol request to the respective clients with expired times. Client tracking component 332 stops tracking each of the clients which do not respond to the address resolution protocol request. It is appreciated that a root device can be implemented as a variety of components including a workgroup bridge, access point, router, etc.

Thus, the present invention is a system and method that facilitates efficient and accurate maintenance of client address lists. The present invention's periodic use of ARP requests and corresponding client response actions to update client address lists permits network devices to update address lists for clients deployed across boundaries of wireless communication environments (e.g., an IEEE 802.11 compliant environment) and wired communication environments. The present invention also prevents false removals of client by root devices from an address list or table which are still associated to the root device, thereby preventing disruption of traffic to such clients.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method comprising:
broadcasting a first address resolution protocol (ARP) request;
adding a client indication to a client tracking list, wherein the client indication corresponds to a response to the first address resolution protocol request from a client device;
sending a second address resolution protocol request to the client device; and
determining a status of the client device with respect to the client tracking list based on at least one action by the client device with regard to the second address resolution protocol request, wherein the status of the client device is forwarded to one or more upstream devices and wherein the one or more upstream devices is configured to incorporate the status in a connectivity list.

2. The method of claim 1, further comprising:
running a client list flush timer for establishing periodic status updates; and
sending the second address resolution protocol request to the client device when the client list flush timer has expired.

3. The method of claim 1, wherein the determining of the status of the client device with respect to the client tracking list further comprises:
leaving the client device on the client tracking list when the client device responds to the second address resolution protocol request; and
removing the client indication from the client tracking list when the client device does not respond to the second address resolution protocol request.

4. The method of claim 1, wherein the client indication is a media access control (MAC) address and the client tracking list is a media access control address list.

5. The method of claim 1, wherein the address resolution protocol request is forwarded across a wireless to wired protocol boundary.

6. The method of claim 1, wherein the address resolution protocol request is forwarded across a boundary spanning an environment compliant with an IEEE 802.11 standard protocol and an environment compliant with an IEEE 802.3 standard protocol.

7. The method of claim 1, wherein the status of the client device with respect to an access point connectivity list is based on the action by the client device with regard to the second address resolution protocol request.

8. The method of claim 1, wherein the client tracking list is a list for tracking client devices communicatively coupled to a workgroup bridge device.

9. A device comprising:
an interface to communicate with one or more client devices; and
a client tracking component to broadcast a first address resolution protocol (ARP) request through the interface and to track a status of at least one client device based on a response to the first address resolution protocol request received from a client device, wherein the client tracking component is configured to send a second address resolution protocol request to the client device and to update a status of the client device according to at least one action taken by the client device with regard to the second address resolution protocol request, wherein the status of the client device is forwarded to one or more upstream devices and wherein the one or more upstream devices is configured to incorporate the status in a connectivity list.

10. The device of claim 9, wherein the client tracking component adds an entry associated with the client device to a client tracking list, and sends the second address resolution protocol request to the client device, and wherein the client tracking component alters the client tracking list by removing the entry when the client device does not respond to the second address resolution protocol request.

11. The device of claim 9, wherein the client tracking component tracks media access control addresses of the one or more client devices communicatively coupled to the device.

12. The device of claim 9, wherein the device is a router.

13. The device of claim 9, wherein the client tracking component determines when a predetermined amount of time has expired since receiving a communication from client devices that have responded to the first address resolution protocol request and sends the second address resolution protocol request to the client devices with associated expired times.

14. The device of claim 9, wherein the client tracking component stops tracking the client devices that do not respond to the second address resolution protocol request.

15. The device of claim 10, wherein the client tracking list includes media access control addresses.

16. A system comprising:
means for broadcasting a first address request;
means for tracking one or more client devices that respond to the first address request in a client tracking list;
means for sending a second address request to at least one client device being tracked;
means for updating a status of the client device tracked in client tracking list based on at least one action by the client device responsive to the second address request; and
means for forwarding the status to one or more upstream devices for incorporation in a connectivity list.

17. A device comprising:
an interface to communicate with one or more client devices; and
a client tracking component to broadcast a first address resolution protocol (ARP) request, to add a client indication to a client tracking list, wherein client indication corresponds to a client device responding to the first address resolution protocol request, to send a second address resolution protocol request to the client device, and to determine a status of the client device with respect to the client tracking list based on at least one action taken by the client in response to receiving the second address resolution protocol request, wherein the client tracking component is configured to forward the status to one or more upstream devices for incorporation in a connectivity list.

18. A device of claim 17 wherein the client tracking component is configured to send the second address resolution protocol request to the client device after a client tracking list flush timer has expired, and wherein the client tracking component is configured to leave the client device on the client tracking list when the client device responds to the second address resolution protocol request, and remove the client indication from the client tracking list when the client device does not respond to the second address resolution protocol request.

19. A device of claim 17 wherein the second address resolution protocol request is sent across a wireless to wired protocol boundary.

* * * * *

UNITED STATES PATENT AND TRADEMARK OFFICE
CERTIFICATE OF CORRECTION

| | | |
|---|---|---|
| PATENT NO. | : 7,529,256 B2 | Page 1 of 1 |
| APPLICATION NO. | : 11/178141 | |
| DATED | : May 5, 2009 | |
| INVENTOR(S) | : Arnavkumar M. Pathan | |

It is certified that error appears in the above-identified patent and that said Letters Patent is hereby corrected as shown below:

At column 8, line 12, claim 17 please delete "client" and insert -- said client --.

Signed and Sealed this

Twenty-second Day of December, 2009

David J. Kappos
*Director of the United States Patent and Trademark Office*